United States Patent
Miranda et al.

(10) Patent No.: US 10,929,775 B2
(45) Date of Patent: Feb. 23, 2021

(54) STATISTICAL SELF LEARNING ARCHIVAL SYSTEM

(71) Applicant: Accenture Global Solutions Limited, Dublin (IE)

(72) Inventors: Abhilash Alexander Miranda, Dublin (IE); Laura O'Malley, Dublin (IE); Pedro L. Sacristan, Dublin (IE); Urvesh Bhowan, Bray Wicklow (IE); Medb Corcoran, Dublin (IE)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 799 days.

(21) Appl. No.: 15/787,608

(22) Filed: Oct. 18, 2017

(65) Prior Publication Data

US 2018/0114144 A1 Apr. 26, 2018

Related U.S. Application Data

(60) Provisional application No. 62/413,428, filed on Oct. 26, 2016, provisional application No. 62/452,713, filed on Jan. 31, 2017.

(51) Int. Cl.
*G06N 20/00* (2019.01)
*G06F 16/11* (2019.01)
*G06F 40/30* (2020.01)
*G06N 5/02* (2006.01)

(52) U.S. Cl.
CPC ........... *G06N 20/00* (2019.01); *G06F 16/113* (2019.01); *G06F 40/30* (2020.01); *G06N 5/022* (2013.01)

(58) Field of Classification Search
CPC ...................................................... G06N 20/00
USPC ....................................................... 706/15, 45
See application file for complete search history.

(56) References Cited

U.S. PATENT DOCUMENTS

| | | | |
|---|---|---|---|
| 7,848,970 B2 | 12/2010 | Kane et al. | |
| 7,908,189 B2 | 3/2011 | Chan et al. | |
| 7,930,195 B2 | 4/2011 | Heyns et al. | |
| 8,639,596 B2 | 1/2014 | Chew | |

(Continued)

OTHER PUBLICATIONS

Australian Examination Report No. 1, issued in corresponding Australian Patent Application No. 2017251771, dated Mar. 15, 2018, pp. 1-7, IP Australia, Phillip, Australia.

*Primary Examiner* — David R Vincent
(74) *Attorney, Agent, or Firm* — Brinks Gilson & Lione

(57) ABSTRACT

A system for self-learning archival of electronic data may be provided. A binary classifier may identify a text segment of an electronic dataset in response to text of the electronic dataset being associated with indicators of a word model. A first multiclass classifier may generate a first classification set comprising respective statistical metrics for the datafield that each predefined identifier in a group of predefined identifiers is representative of the datafield. A second multiclass classifier may receive a context of the electronic dataset and generate a second classification set. A combination classifier may apply weight values to the first classification set and the second classification set and form a weighted classification set and select a predefined identifier as being representative of the datafield based on the weighted classification set. The processor may store, in a memory, a data record comprising an association between the predefined identifier and the datafield.

20 Claims, 6 Drawing Sheets

(56) References Cited

U.S. PATENT DOCUMENTS

| | | |
|---|---|---|
| 9,141,622 B1 | 9/2015 | Moore |
| 2002/0091597 A1 | 7/2002 | Teng |
| 2005/0060643 A1 | 3/2005 | Glass et al. |
| 2008/0069437 A1* | 3/2008 | Baker .................. G06K 9/6256 382/159 |
| 2009/0274376 A1 | 11/2009 | Selvaraj et al. |
| 2010/0017487 A1 | 1/2010 | Patinkin |
| 2010/0250409 A1 | 9/2010 | Savage et al. |
| 2013/0024407 A1 | 1/2013 | Thompson et al. |
| 2014/0229164 A1* | 8/2014 | Martens .................. G06F 40/40 704/9 |
| 2014/0279384 A1 | 9/2014 | Loevenich |
| 2016/0335260 A1 | 11/2016 | Convertino et al. |
| 2016/0335435 A1* | 11/2016 | Schmidtler ............ G06F 21/562 |
| 2017/0132866 A1 | 5/2017 | Kuklinski et al. |

* cited by examiner

STATISTICAL SELF LEARNING ARCHIVAL SYSTEM

CROSS REFERENCE TO RELATED APPLICATIONS

This application claims the benefit of U.S. Provisional Application No. 62/413,428 filed Oct. 26, 2016 and U.S. Provisional Application No. 62/452,713 filed Jan. 31, 2017, the entirety of each of these applications is hereby incorporated by reference.

TECHNICAL FIELD

This disclosure relates to electronic archival systems and, in particular, to a self-learning electronic archival system.

BACKGROUND

Systems with large quantities of data may from suffer from inaccurate data classification, inefficient storage, unorganized record keeping, and other related problems. These and other deficiencies in data archival systems results in errors and in accuracies in data organization. As large quantities of electronic data accumulate, it may become increasingly difficult to meaningfully identify and classify the electronic data in a reasonable amount of time. Thus, present approaches to electronic data storage and organization suffer from a variety of drawbacks, limitations, and disadvantages. There is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, systems and methods for self-learning archival of electronic data are provided. For example, the system may include a binary classifier. The binary classifier may identify a text segment of an electronic dataset in response to text of the electronic dataset being associated with indicators of a word model. The word model may include a group of machine readable text characters. In some examples, the word model may include rule-based, statistical, logical, relation-based, abstract or conceptual characterization of one or more groupings of words. Examples of such characterizations include datafield or non-datafield indicators, text statistics, and logical or semantic distance between various words or groupings thereof. The binary classifier may determine that the text is a datafield based on a comparison of the text segment with the indicators of the word model. The system may further include a first multiclass classifier executable by the processor to receive the datafield. The first multiclass classifier may generate a first classification set comprising respective accuracies for the datafield that each predefined identifier in a group of predefined identifiers is representative of the datafield. The system may further include a second multiclass classifier. The second multiclass classifier may receive a context of the electronic dataset and generate a second classification set. The second classification set may include respective accuracies for the context of the electronic dataset that each predefined identifier in the group of predefined identifiers is representative of the context. Furthermore, the system may include a combination classifier. The combination classifier may apply weight values to the first classification set and the second classification set and form a weighted classification set. The combination classifier may select a predefined identifier of the predefined identifiers as being representative of the datafield based on the weighted classification set. The system may store, in a memory, a data record comprising an association between the predefined identifier and the datafield.

One interesting feature of the systems and methods described below may be that the context of the datafield may be used to improve the accuracy of assigning predefined identifiers of an identification scheme to the datafield. Alternatively, or in addition, an interesting feature of the systems and methods described below may be that classifiers may be updated to continuously improve the accuracy of future associations between datafields and predefined identifiers. Accordingly, machine learning may be used to improve identification of data according to rules of an identification scheme.

Figure 1:
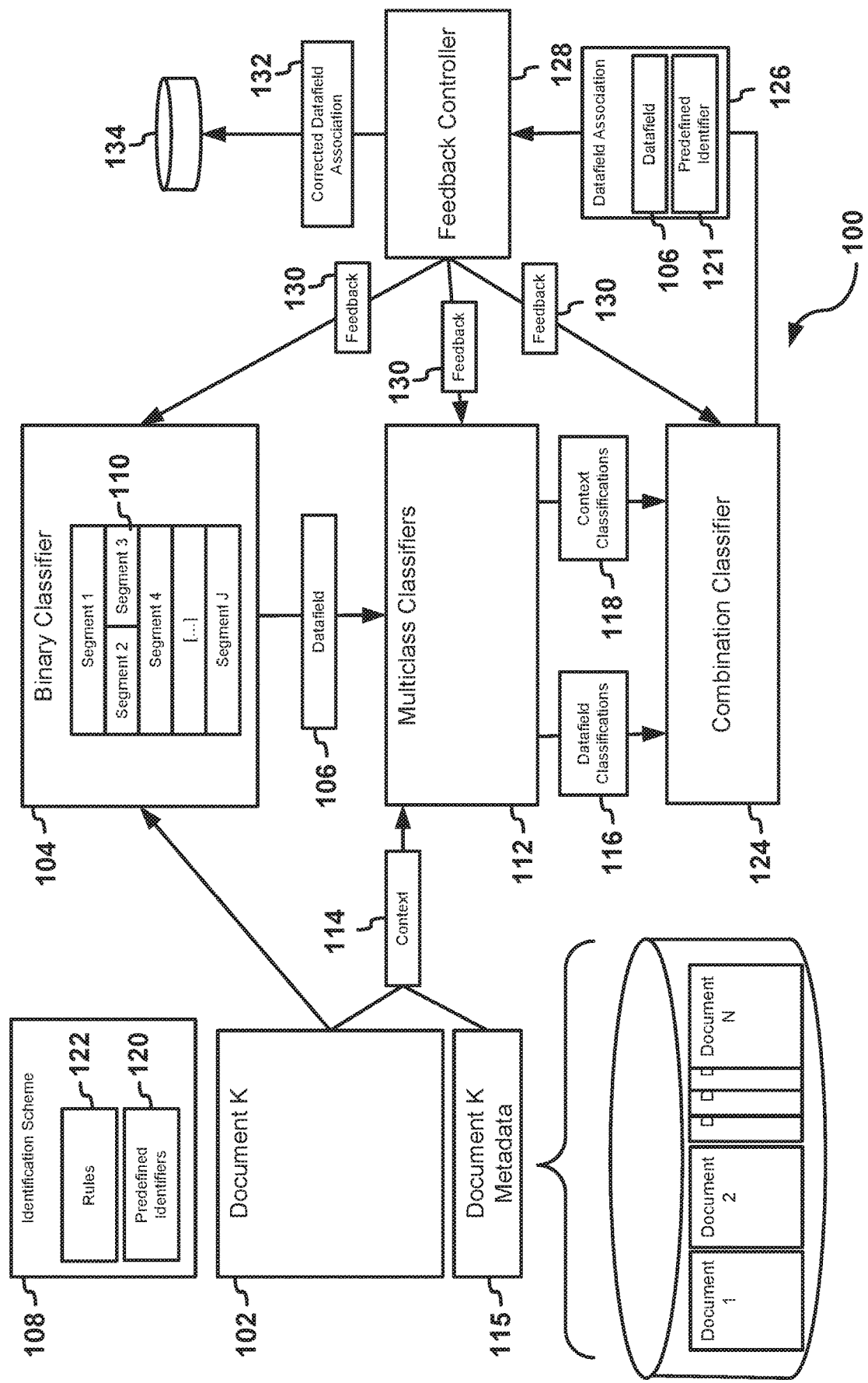
FIG. 1 illustrates an example of a system to archive an electronic dataset.

FIG. 1 illustrates an example of a system 100 to archive an electronic dataset 102. The electronic dataset 102 may include a discrete grouping of electronic data, such as an electronic document. In other examples, the electronic dataset 102 may include text, images, spreadsheets, bitmap, post script, and any other form of digital content. In some examples, a document image may be converted into the electronic dataset through optical character recognition (OCR).

The system 100 may include a binary classifier 104. The binary classifier 104 may receive the electronic dataset 102. The binary classifier 104 may determine that the content of the electronic dataset 102 includes a datafield 106. The datafield 106 may include a portion of the electronic dataset 102 relevant to an identification scheme 108. The datafield 102 may include text, images, or combinations of text and images. For example, the datafield 106 may include information, such as line items in an electronic invoice, images of trade logos positioned in the header of the document, transactions in a procurement ledger or budget spreadsheet, list of damages or ailments in an insurance claim, medications prescribed in a doctor's note or in a medical system, purchase items in a shopping list or expense receipt, line-items in an instruction set or to-do list, appointments in a calendar, ingredients in a recipe, image segments in a large document, line items in a delivery note, table in a document or database, or any other form of information organized in an electronic collection of information.

The binary classifier 104 may identify the content of the electronic dataset 102 that qualifies as the datafield 106. For example, the binary classifier 104 may identify patterns in structured and/or unstructured grouping of characters of the electronic dataset 102. In some examples, the binary classifier 104 may perform statistical analysis on the content of the electronic dataset 102 to determine the existence of the datafield 106. For example, the binary classifier 104 may include a machine-learning model such as a support vector machine on a bag of words or another form of machine-learning statistical data model. In some examples, the binary classifier 104 may qualify the content of the electronic dataset 102 as the datafield 106 based on text of the electronic dataset 102.

The binary classifier 104 may recognize the datafield 106 without reference to any addition information related to a position of the content in the electronic dataset 102. For example, the binary classifier 102 may identify the datafield 106 without identifying an end-of-file character, end-of-line character of any control character of a character encoding or a document protocol. Alternatively or in addition, the binary classifier 102 may determine the datafield 106 based on the layout of the content of the electronic dataset 102. For example, the binary classifier 104 may determine that the content at a particular position qualifies as the datafield 106. Alternatively or in addition, the binary classifier 104 may analyze the control characters, alphanumeric character, images, content positioning, and/or any other information related to the electronic dataset 102 to determine the existence of the datafield 106. The portion of the electronic dataset 102 identified as the datafield 106 may be any portion of the electronic dataset, including a line, cell, paragraph, word, an area identified by markers such as coordinates, rules, special characters, patterns or any other part of the electronic dataset.

While the binary classifier 104 illustrated in FIG. 1 receives the electronic dataset 102, other examples of the binary classifier 104 may receive a text segment 110 of the electronic dataset 102. For example, OCR may be performed on the electronic dataset 102 to convert portions of an image into text. The text may be divided into text segments. Each of the text segments may be provided to the binary classifier 102. For example, the binary classifier 102 may determine that the text segment 110, or a portion of the text segment 110, qualifies as the datafield 106.

In some examples, the binary classifier 104 may receive images. For example, the electronic dataset 102 may include images. The binary classifier 104 may determine whether one or more of the images, or parts thereof, qualify as the datafield 106. For example, the binary classifier 104 may determine whether the images, or parts thereof, are relevant to the identification scheme 108.

The system 100 may include a multiclass classifier 112. The multiclass classifier 112 may receive the datafield 106 and/or a context 114 of the datafield 106, and determine predictive classifications 116,118 between the datafield 106 and predefined identifiers 120 of the identification scheme 108. The predictive classifications 116,118 may include, for example, a datafield classification 116 and a context classification 118.

The datafield classifications 116 may include a set of classifications of the datafield. The set of classifications may include a respective statistical metric of one or more of the predefined identifiers 120 being representative of the datafield 106. Thus, the datafield associations may include datafield association statistical metrics. The datafield association statistical metrics may include the set of respective statistical metrics that the datafield 106 is associated to the complete or partial set of predefined identifiers. For example, the datafield classifications 116 may include an statistical metrics of a predefined identifier 121 representing, summarizing, categorizing, qualifying, or otherwise characterizing the datafield 106 according to the rules 122 of the identification scheme 108. Examples of the rules 122 include if-then-else decision functions, text or numerical value discriminants, boundary-margin-neighborhood definition for classifiers. In some examples, the datafield associations may include a set of respective accuracies for the datafield 106 that each of the predefined identifiers 120 is representative of the datafield 106.

The context classification 118 may include a set of classifications of the context 114 of the datafield 106. The set of classifications of the context may include a respective statistical metric of one or more of the predefined identifiers 120 being representative of the context 114 of the datafield 106. For example, the context classification 118 may include an accuracy of the predefined identifiers 120 representing, summarizing, categorizing, or otherwise characterizing the context 114 of the datafield 106. For example, the context classifications 118 may include accuracy that the context 114 is related to the datafield 106 that is represented by one or more of the predefined identifiers 106. In some examples, the context classification 118 may include a set of respective statistical metrics corresponding to each of the predefined identifiers 120 of the identification scheme 108. In some other examples, the context classification 118 may include a set of one or more alternative predefine identifiers 106 presented with their respective statistical metrics.

The context 114 of the datafield 106 may include information that is related to the datafield 106 and/or the electronic dataset 102. For example the context 114 of the datafield 106 may include the text of the electronic dataset 102 that may be adjacent, such as before or after, the datafield 106. Alternatively or in addition, the context 114 may include all of the content, such as all of the text, of the electronic dataset 102. The context 114 may be obtained from the electronic dataset 102 directly or from a memory, such as a database.

In some examples, the context 114 may include metadata 115 of the electronic dataset 102. The metadata 115 may be any operational data directly or indirectly available from, or associated with, the electronic dataset 102. Examples of metadata 115 may include a name of the electronic dataset, a name of a person and/or entity associated with the electronic dataset, the address of the person and/or entity, order numbers, addresses, personnel or business names, references and contacts relevant to dataset 102, geographical information, any dates or references associated with the electronic dataset 102, and/or other information relevant to the electronic dataset 102 and the industry and/or commercial practices that generated the electronic dataset 102. Further, the metadata 115 may include data that is not necessary contained in the electronic dataset 102, but is relevant to the electronic databased based on the rules 122. For example, the metadata 115 may include information, such as vendor information, that is blacklisted in which case the purpose of datafield association is defeated.

In some examples, the context classification 118 may include whole-content association statistical metrics and metadata association statistical metrics. Whole-content association statistical metrics include the statistical metrics, as described herein, that text of the whole-content of the electronic dataset 102 may include and/or be representative of one or more of the predefined identifiers 120. The metadata association statistical metrics include the the statistical metrics, as described herein, that the metadata 115 is associated with an electronic data set 102 that contains text that is representative of one or more of the predefined identifiers 120.

The terms "representative of" or "represents" used in conjunction with the predefined indicators 120 means summarizes, categorizes, qualifies, associates or otherwise classifies the information associated with the predefined identifiers 120. In some examples, a predefined identifier 121 may be representative of a datafield. In other examples, a predefined identifier may be representative of the context 114 of the datafield 106. A predefined identifier representative of the context 114 of the datafield 106 may be indicative of the context being associated with and/or including the datafield 106 represented by the predefined identifier. Thus, for example, the context 114 may include a file name, owner information, or other forms of metadata and whole-text data described herein. The predefined identifier may be said to be representative of the context 114, for example the file name, when the context is associated with electronic datasets that have historically included datafields that were represented by the predefined identifier. In other examples the file name or other examples of the context 114 may include the datafield itself.

The terms "accuracy", "confidence", "probability" and "estimation", as described herein, means the quantifiable veracity of an outcome. For example, the accuracy may include a numerical probability that one of the predefined identifiers 120 is representative of the text of the datafield 106 and/or the context 114. Alternatively or in addition, the accuracy may include a statistical confidence. The multiclass classifiers 112 may generate the accuracies of the datafield classifications 116 and accuracies of the context classifications 118, for example, based on statistical modeling of the text of the datafield 106 in conjunction with the validity of historical calculations of the accuracies of the estimation between the predefined identifiers 120 being associated with data fields. The term accuracy may be used interchangeably with estimation.

The term "statistical metric", as described herein, is used to describe any statistical variable that is predictive of an outcome or the reliability of the outcome. Thus, statistical metrics may include accuracy, confidence, probability, estimation, as described herein, and/or any other term traditionally associated with statistics that describes an estimation and/or quantifies the reliability, significance, and/or veracity of the outcome. The outcome may be any classification and/or identification as described herein. For example, the outcome may include any determination generated by the binary classifier 104, the multiclass classifiers 112, and the combination classifier 114, or any other component of the system. Alternatively or in addition, the outcome may include the datafield association 126, the datafield classifications 116, the context classifications 118, the classification of text segments 110 as the datafield 106, or any other statistical determination, association, or conclusion.

The system 100 may include a combination classifier 124. The combination classifier 124 may determine a datafield association 126 between the datafield 106 and the predefined identifier 121 based on the predictive classifications 116, 118. For example, the combination classifier 124 may aggregate the predictive classifications 116, 118. The aggregation can be done in different ways such as a weighted average where the weight values are set according to business logic, count statistics, cross-validation of classifier performance, or a winner-take-all approach. The datafield association 126 may be a determination of an association between the one or more of the predefined identifiers 120 and the datafield 106. The combination classifier 124 may enrich the text segment 110 of the electronic dataset 102 by including statistical context relevant to the identification scheme 108. Thus, the data field associations 116 and context classifications 118 are combined to provide an improved datafield association 126.

The combination classifier 124 may select the most confident or probable or accurate predictive classifications 116, 118. Alternatively, or in addition, the combination classifier 124 may combine the predictive classifications 116,118 to form combined datafield associations. The combined datafield associations may include respective accuracies of the predefined identifiers 120 being representative of the datafield 106. The combined datafield associations may be more accurate than the datafield classifications 116 taken alone because the combined datafield association may be substantiated by evidence provide by the context classifications 118.

The system 100 may include a feedback controller 128. The feedback controller 128 may receive the datafield association 126 and any other information used to determine the datafield association 126, such as the datafield 106, the predictive classifications 116, 118 and the context classifications 118. The feedback controller 128 may determine the validity of datafield association 126. The feedback controller may generate association feedback 130 in response to the datafield association 126 being valid and/or invalid. The association feedback 130 may be supplied to the binary classifier 104, the multiclass classifiers 112 and/or the combination classifier 124. The binary classifier 104, the multiclass classifiers 112 and/or the combination classifier 124 may be responsive to the association feedback 130 to improve the validity of output from each classifier.

The datafield association 126 may include an association between the datafield 106 and the predefined identifier 120. For example, the datafield association 126 may include any information that associates the predefined identifier 120 with the datafield 106. For example, the datafield association 126 may include a table that relates an ID of one or more of the predefined identifiers with the datafield 106. Alternatively, the datafield association may include a label of the predefined identifier 120 and the text of the datafield 106. Thus, the datafield association 126 may include any information of the datafield 106 and the predefined identifier 121 that relates and/or links the predefined identifier 121 with datafield 106. The datafield association 126 may be stored in a memory, such as a database. In some examples, the datafield association 106 is stored with the predefined identifier 121, the datafield 106, and/or other related information. The datafield association 126 may be stored in any manner that relates the predefined identifier 120 with the datafield 106.

The identification scheme 108 may include any convention of association between the predetermined identifiers 120 and information. The identification scheme 126 may include the predefined identifiers 120 and rules 122. The predefined identifiers 120 may include categorical identifiers, summaries, account identifiers, or any other information used to identify and/or classify information. The rules 122 may include the rubric for associating the predefined identifiers with the datafields. The feedback controller 128 may use the rules to determine if the association between the datafield 106 and the predefined identifier 120 is valid. In some examples, the feedback controller 128 may correct the datafield association 126 to form a corrected datafield association 132. Corrected datafield associations 132 may be stored in memory, such as the database 134.

Text, numerical data, images, and other historical data from electronic datasets and their associated predefined identifiers are retained for compliance, training, quality control, etc. The historical data can be used by statistical classifiers to mine or generate the rules 122 that can approximate the classifications. For example, statistical classification can (1) determine the part of the electronic dataset 102 that includes a datafield 106 and (2) determine the predefined identifier 121 associated with the datafield 106. Examples of such the rules 122 include if-then-else decision functions, text or numerical value discriminants, boundary-margin-neighborhood definition for classifiers. Statistical rules that perform the best in terms of accuracy and computations will be retained for automated associations between predefined identifiers 120 and future electronic datasets.

The system 100 may receive the predefined identifiers 120 and/or the rules 122 from a database (not shown) or user (not shown) of the system. For example, the user may input the predefined identifiers 120 and/or the rules 122 into a terminal (not shown). The identification scheme 108 may be periodically updated. When identification scheme 108 is updated, the feedback controller 128 may generate association feedback 130 based on past datafield associations. Alternatively or in addition, the feedback controller 128 may apply the updated identification scheme to the datafield associations that occur after the update. Thus, the system 100 will self-learn as the feedback controller 128 communicates the association feedback 130 to each classifier.

Figure 2:
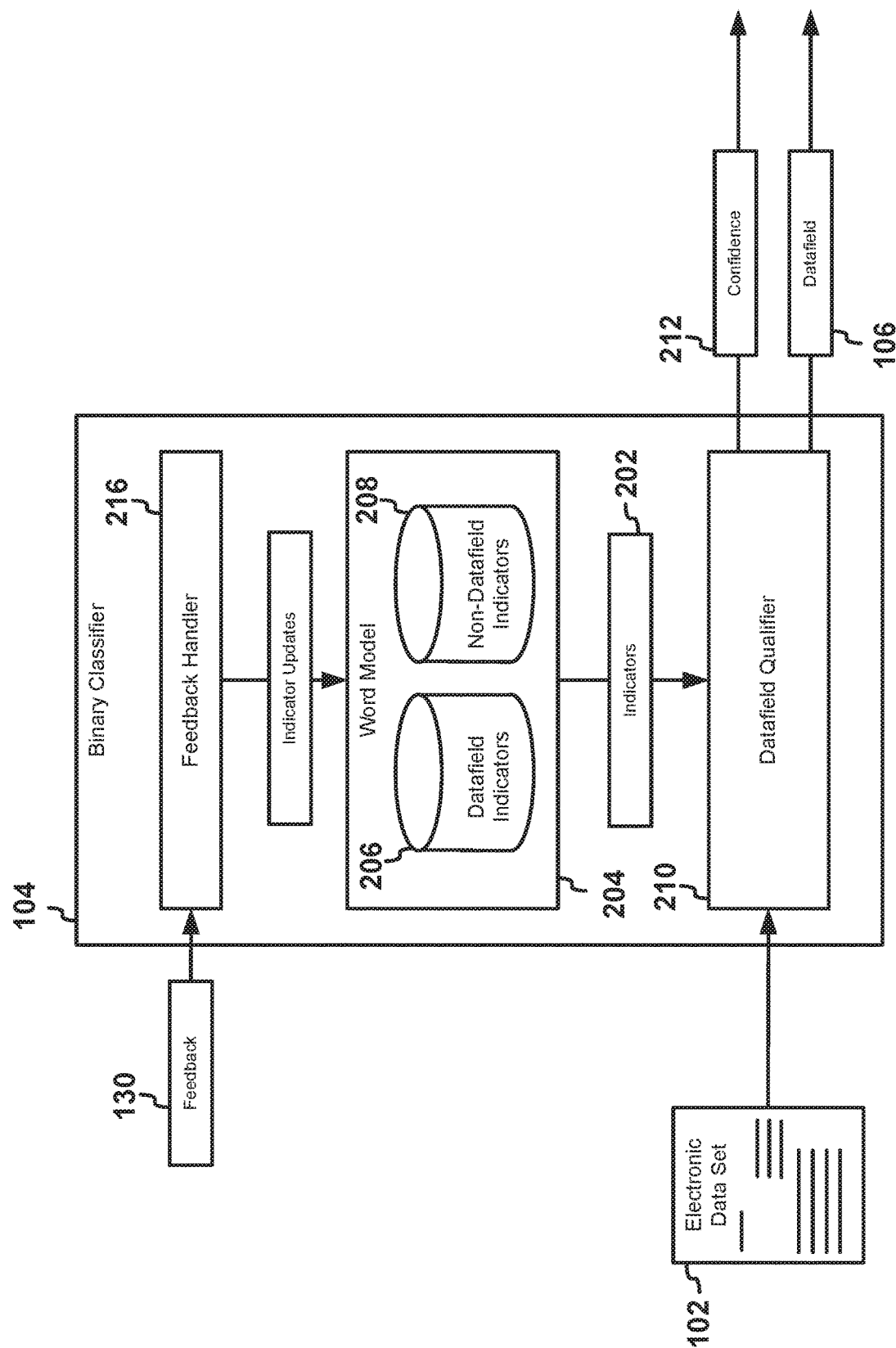
FIG. 2 Illustrates an example of a binary classifier.

FIG. 2 illustrates an example of the binary classifier 104. The binary classifier 104 may identify a portion of the electronic dataset 102 in response to the portion of the electronic dataset 102 being associated with indicators 202 of a word model 204. The indicators 202 of the word model 204 may include datafield indicators 206 and non-datafield indicators 208. The word model 204 may include a machine learning model such as a support vector machine on a bag of words or a word vector based model capable of statistically categorizing data based on groupings of characters. The indicators 202 may include words, characters, and/or patterns of characters. Alternatively or in addition, the indicators 202 may include non-alphanumeric characters, control characters, or any other information that indicates the position, orientation, layout, and/or meaning of information.

The datafield indicators 206 may include a portion of the indicators 202 that are suggestive of an existence of the datafield 106. Thus, the datafield indicators 206 may suggest that the content of the electronic dataset 102 includes the datafield 106. The non-datafield indicators 208 may include a portion of the indicators 202 that are not suggestive of the datafield 106. Thus, the non-datafield indicators 208 may suggest that the content of the electronic dataset 102 does not include the datafield 106.

The binary classifier 104 may receive the content of the electronic dataset 102 and identify the text segment 110 with a datafield qualifier 210. In some examples, the content may include all of the electronic dataset 102 and the datafield qualifier 210 may identify the text segment 110 that includes the datafield 106. In other examples, the text segment 110 may have been previously extracted from the electronic dataset 102 prior to the datafield qualifier 210 receiving the text segment 110.

The binary classifier 104 may determine that the text segment 110 includes the datafield 106 based on a comparison of the text segment 110 with the indicators 202 of the word model 204. For example the datafield qualifier 210 may apply the datafield indicators 206 and/or the non-datafield indicators 208 to a machine-learning statistical model to determine that the text segment 106 includes the datafield 106. Non-limiting examples of a machine-learning statistical model include, for example, deep learning; generalized linear models, for example, logistic regression; support vector machines using, for example, linear or radial based function kernels; decision trees such as random forests; local learners, for example, nearest neighbors; and/or lazy learning. The datafield qualifier 210 may, additionally or in the alternative, use non-statistically based models such as, for example, rules based expert systems.

In some examples, the binary classifier 104 may generate an estimation of the text segment 110 being the datafield 106 based on a comparison of the text segment 110 with the indicators 202 of the word model 204. The datafield qualifier 210 may determine that the text segment 110 includes a datafield 106 based on the estimation of the test segment 110. The estimation of the text segment 110 may include a confidence 212, such as a statistical probability, that the text segment 110 includes the datafield 106. The datafield qualifier 210 may determine that the text segment 110 includes the datafield 106 in response to the confidence being greater than a confidence threshold, such as a predefined probability. The confidence threshold may be a threshold that defines the level of confidence that is sufficient to qualify the text segment 110 as the datafield 106.

The text segment 110 may include any portion of the electronic dataset 102. For example, the text segment 110 may include structured and/or unstructured content of the electronic dataset. Alternatively or in addition, the text segment may include a group of characters, words, sentences, and/or paragraphs. In some examples, the text segment may include spaces or other control characters in the electronic dataset.

The binary classifier 104 may receive the association feedback 130 from the feedback controller 128. The association feedback may include a validity indication of qualifying the text segment 110 as the datafield 106. For example the validity indication may specify that the text segment 110 was correctly and/or incorrectly qualified as the datafield 106. In some examples, the association feedback 130 may include additional information, such as the indicators 202 that were used by the datafield qualifier 210 to qualify the text segment 110 as the datafield 106. Alternatively or in addition, the association feedback 130 may include the confidence 212 of the estimation of the text segment 110 being the datafield 106, or any other information that was used to qualify the text segment 110 as the datafield 106.

The confidence 212 may be any quantifiable statistical representation of probability. For example, the confidence 212 may consist of a numerical value or values that represent the degree of validity. Thus, the confidence 212 may include a probability, such as a numerical probability. In some examples the confidence 212 may include a number between 0 and 100. The binary classifier 104 may calculate the confidence 212 of the text segment 110, or other text, being the datafield 106. Confidences may be calculated by other components of the system 100. For example, the multiclass classifiers 112 may calculate a respective confidence for one or more of the predefined identifiers being representative of the text of the datafield 106 and/or the context 114 of the datafield 102.

The binary classifier 104 may include a feedback handler 216 which may be responsive to the association feedback 130. The feedback handler 216 may update the word model 204 in response to the association feedback 130. For example, the feedback handler 216 may determine that the text segment 110 was correctly qualified as the datafield 106. The feedback handler may update the datafield indicators 206 and/or the non-datafield indicators 208. Characters, groups of characters, patterns, and any other information stored in the word model 204 may be updated to increase the accuracy of future qualifications of text segments as datafields. In some examples, the feedback handler may update the word model 204 by adding or removing text from the word model. For example, the feedback handler 216 may detect an invalid qualification of the datafield 106 and remove all, or a portion, of the text of the datafield 106 from datafield indicators 206 and/or the non-datafield indicators 208.

The binary classifier 104 may qualify additional forms of information, in addition to text segments, as datafields. For example the binary classifier 104 may receive images from the electronic dataset 102. The datafield qualifier 210 may determine whether the images qualify as the datafield 106. Images may be classified as datafields using RGB or greyscale values of the image pixels as a vector of input to statistical models such as convolutional neural networks, linear discriminant analyzers, support vector machines, and logistic regression.

Figure 3:
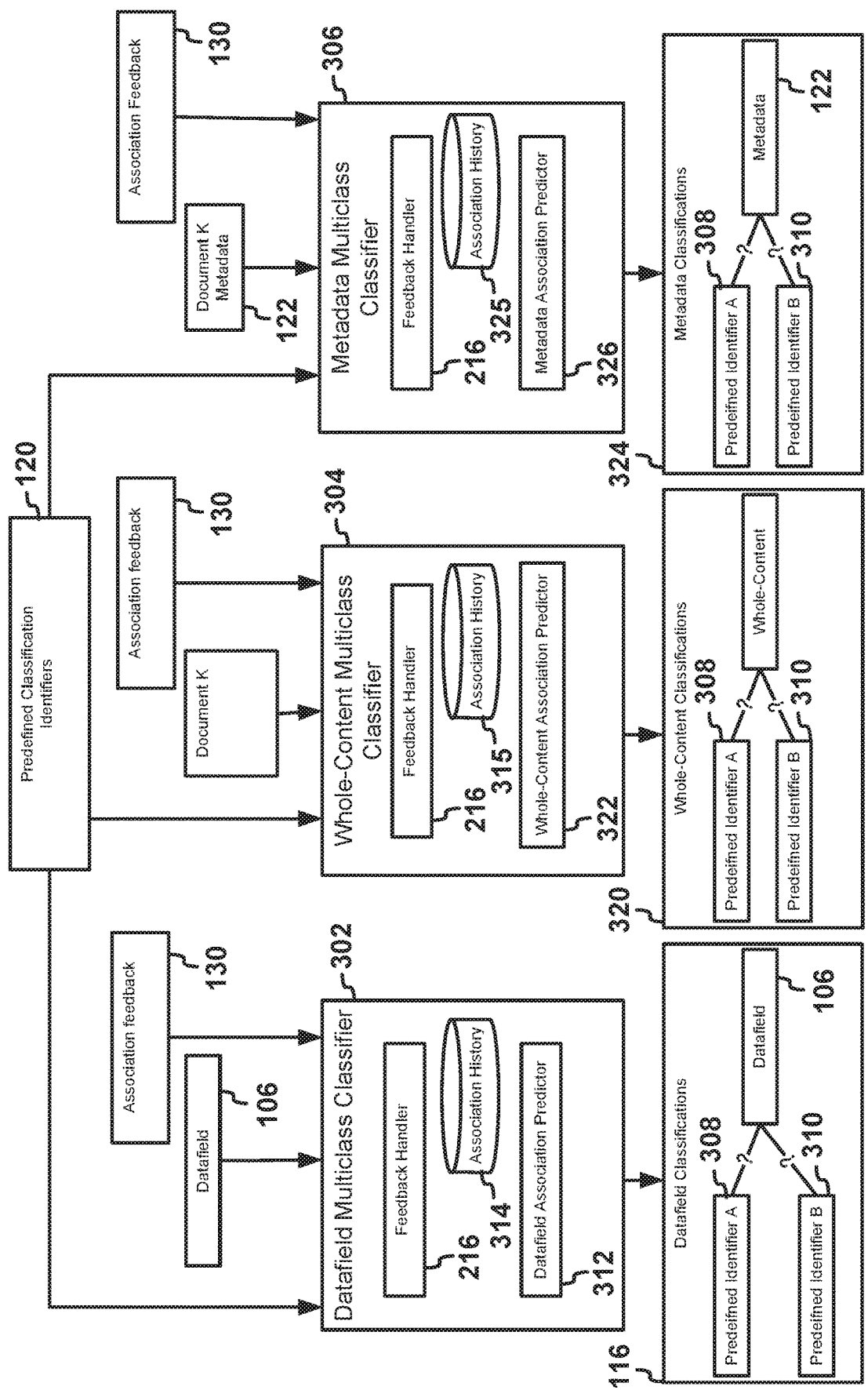
FIG. 3 illustrates an example of multiclass classifiers.

FIG. 3 illustrates an example of the multiclass classifiers 112. The system 100 may include multiple versions of the multiclass classifiers 112. For example, the system 100 may include a first multiclass classifier 302, a second multiclass classifier 304, and a third multiclass classifier 306.

The first multiclass classifier 302 may generate the datafield classifications 116. The datafield classifications 116 may include an accuracy of a first predefined identifier 208 being representative of the datafield 106. In addition, the datafield classifications 116 may include an accuracy of a second predefined identifier 210 being representative of the datafield 106. In other examples, the datafield classifications 116 may include any number of respective estimations and/or accuracies of each predefined identifier of the predefined identifiers 120 being representative of the datafield 106.

The first multiclass classifier 302 may perform statistical analysis on the datafield 106 to determine the datafield classifications 116. For example, the first multiclass classifier 302 may include a datafield association predictor 312 and a datafield association history 314. The datafield association history 314 may include a data model of previous estimated datafield associations, accuracies of previous associations and/or any historical information that was used to determine the previous datafield associations. In addition, the datafield association history 314 may include corrections, updates, and any other information regarding the validity of previous datafield associations. The datafield association estimator may refer to the datafield association history 314 to determine the datafield classifications 116. For example, the datafield association predictor 312 may apply statistical models to the datafield 106 and/or the datafield association history 314 to determine the association between the predefined identifiers 120 and the datafield 106. The statistical model may include, for example, the machine learning models as describe herein. The first multiclass classifier 302 may output a list of classifications corresponding to each predefined identifier associated with the datafield 106.

The datafield association history 314 and/or the datafield association predictor 312 may be generated and maintained to provide the datafield classifications 116. Historical information including, for example, historical samples of datafields and/or non-datafields and their corresponding predefined identifiers 120 may be prepared. The historical information may be split into training sets and test sets. The datafields and/or non-datafields may be represented by word vectors such as bag-of-words, word2vec, doc2vec and GloVe. The datafield association history 314 may be built on the training sets to generate statistical rules such that the performance of the data field association predictor 312 in predicting the datafield classifications 116 is optimal in terms of statistics such as accuracy, confidence, probability, precision and recall. A test set is applied to the datafield association history 314 to determine if the performance of the datafield association history 314 on the test set is also satisfactory. Once a satisfactory datafield association history 314 is obtained, the datafield association history 314 may be retained. In some examples, alternative configurations of the datafield association history 314 may be updated by, for example, adjusting the parameters of the datafield association predictor 312 and/or modifying the datafield association history 314. Moreover, a rules-based word model and/or a word model based on prior knowledge may be incorporated in the datafield association history 314.

In some examples, the first multi-class classifier 302 may receive the text of the datafield 106 and an indication that the text does not represent the datafield 106. For example, the binary classifier 104 may supply the indication to the first multi-class classifier 302. Alternatively, the multiclass classifier may receive the confidence 212 of the datafield qualification and determine the confidence 212 does not satisfy a confidence threshold. When the first multiclass classifier 302 determines that the text is not a valid datafield, the first multiclass classifier 302 may output a list of zero probabilities for all of the predefined identifiers 120.

The first multiclass classifier 302 may receive the association feedback 130. The association feedback 130 may include any information that was relevant to the datafield classifications 116. For example, the association feedback 130 may include a validity of the datafield association 126 that was made by the combination classifier 124 based on the datafield classifications 116. Alternatively or in addition, the association feedback may include the datafield 106 and/or the portion of the predefined identifiers 120 that were correctly and/or incorrectly associated. In some examples, the first multiclass classifier 302 may query previous datafield association estimations in the datafield association history 314.

The first multiclass classifier 302 may determine a validity of the datafield classifications 116 based on the association feedback 130. For example the first multiclass classifier 302 may include the feedback handler 216. The feedback handler 216 of the first multiclass classifier 302 may determine that the datafield classifications 116 were too confident. In other examples, the first multiclass classifier 302 may determine that the datafield classifications 116 were not confident enough. The first multiclass classifier 302 may update the statistical models based on the association feedback 130 to increase the accuracy of future estimations. For example, the datafield association history 314, or the training dataset used to build the datafield association history 314, may expand to include the association feedback 130. In some examples, when a sufficient amount of association feedback 130 has been received to warrant an update of the datafield association history 314 (e.g., rate of erroneous data field classifications have become higher than acceptable), the datafield association history 314 is updated using an expanded dataset generated based on the datafield association history 314. Alternatively, or in addition, the datafield association predictor 312, and any statistical models comprising the datafield association predictor 312, may be updated based on the association feedback 130 and/or gained knowledge based on commercial/industrial practices.

The system 100 may include additional multiclass classifiers that use the context 114 of the datafield 106 to determine the context classification 118. In some examples, the context 114 may include an entirety of the electronic document (whole-content). Accordingly, the system 100 may include a second multiclass classifier 304. The second multiclass classifier 304 may generate the whole-content classification 320. The whole-content classifications 320 may include an estimation that the first predefined identifier 308 is representative of the whole-content of the electronic dataset 102. For example, the whole content association 320 may be predictive of the electronic dataset including datafields that are associated with the first predefined identifier 308. In addition, the whole-content association may include an accuracy that the second predefined identifier 310 is representative of whole-content of the electronic dataset 102. In other examples, the whole-content classifications 320 may include any number of respective accuracies of each predefined identifier of the predefined identifiers 120 being representative of the whole-content.

The second multiclass classifier may include a machine learning text classifier that analyzes the whole-content of the electronic dataset 102. The second multiclass classifier may convert the entire electronic dataset 102 text to a word vector, used as input to a machine learning classifier (e.g. logistic regression, artificial neural network, and/or other statistical models). The word vector can be constructed in several ways such as a bag-of-words vector indicating word frequencies or word2vec indicating word separation, or distributed representations of sentences and documents such as Doc2Vec and GloVe.

The second multiclass classifier 304 may perform statistical analysis on the whole-content of the electronic dataset 102 to determine the whole-content classification 320. For example, the second multiclass classifier 304 may include a whole-content predictor 322 and a whole-content association history 315. The whole-content association history 315 may include information related to previous estimated whole-content associations. For example, the whole-content association history may include a data model of previous whole-content associations, an accuracy of each previous whole-content associations, a validity of each of the previous content associations and other information related to the previous estimated whole-content associations. In addition, the whole-content association history 315 may include corrections, updates, and any other information regarding the validity of the previous datafield associations. The whole-content estimator may refer to the whole-content association history 315 to determine the estimated whole-content classification 320. For example, the whole-content predictor 322 may apply statistical models and/or word models to the whole-content of the electronic dataset 102, the predefined identifiers 120, and/or the whole-content association history 315. The second multiclass classifier 304 may output a list of respective classifications corresponding to each of the respective predefined identifiers 120 being associated with the whole-content of the electronic dataset 102. Each of the respective classification may include a probability that the electronic dataset 102 includes at least one datafield 106 associated with a corresponding predefined identifier.

The whole-content association history 315 and/or the whole-content association predictor 322 may be generated and maintained to provide the whole-content classifications 320. Historical information including, for example, historical samples of the whole content of electronic datasets and their corresponding predefined identifiers 120 may be prepared. The historical information may be split into training sets and test sets. The whole content of electronic datasets may be represented by word vectors such as bag-of-words, word2vec, doc2vec and GloVe. The whole-content association history 315 may be built on the training sets to generate statistical rules such that the performance of the whole-content association predictor 322 in predicting the whole-content classifications 320 is optimal in terms of statistics such as accuracy, confidence, probability, precision and recall. A test set is applied to the whole-content association history 315 to determine if the performance of the whole-content association history 315 on the test set is also satisfactory. Once a satisfactory whole-content association history 315 is obtained, the whole-content association history 315 may be retained. In some examples, alternative configurations of the whole-content association history 315 may be updated by, for example, adjusting the parameters of the datafield association predictor 312 and/or modifying the whole-content association history 315. Moreover, a rules-based word model and/or a word model based on prior knowledge may be incorporated in the whole-content association history 315.

The second multiclass 304 classifier may receive the association feedback 130. The association feedback 130 may include information indicative of a validity of the datafield association 126 that was made based on the whole-content classification 320. For example, the association feedback 130 may include any information that was relevant to generating the whole-content classification 320. In some examples, as previously discussed, the association feedback 130 may additionally include the datafield 106 and the predefined identifiers 120 that were correctly and/or incorrectly associated. In some examples, the second multiclass classifier 304 may search the whole-content association history 315 using the information provided by the association feedback 130 and update the whole-content association history 315 based on the association feedback 130.

The second multiclass classifier 304 may determine a validity of one or more datafield classifications 116 based on the association feedback 130. For example the second multiclass classifier may determine that the whole-content classifications 320 were too confident. In other examples, the first multiclass classifier may determine that the whole-content classifications 320 were not confident enough.

The second multiclass classifier 304 may update the statistical models based on the association feedback 130 to increase the accuracy of future predictions. For example, the whole-content association history 315, or the training dataset used to build the datafield association history 314, may expand to include the association feedback 130. In some examples, when a sufficient amount of association feedback 130 has been received to warrant an update of the whole-content association history 315, the whole-content association history 315 is updated using an expanded dataset generated based on the datafield association history 314. Alternatively, or in addition, the whole-content association predictor 322, and any statistical models comprising whole-content association predictor 322, may be updated based on the association feedback 130 and/or gained knowledge based on commercial/industrial practices.

In some examples, the context 114 may include the metadata 115 of the electronic dataset 102. Accordingly, the system 100 may include the third multiclass classifier 306. The third multiclass classifier 306 may generate a metadata classification 324. The metadata classification 324 may include an estimation that the first predefined identifier 308 is representative of the metadata 115 of the electronic dataset 102. For example, the metadata classification 324 may be predictive of the metadata 115 of the electronic dataset 102 including datafields that are associated with the first predefined identifier 308. In addition, the metadata classification 324 may be predictive of the second predefined identifier 310 being representative of the metadata 115 of the electronic dataset. In other examples, the metadata classification 324 may include any number of respective accuracies of each of the predefined identifiers 120 being representative of the metadata 115.

The third multi-class classifier may include a classifier that applies machine learning to past frequencies of predetermined identifiers 120 being associated with the metadata 115 that is associated with the datafield 106. The third multiclass classifier 306 may perform statistical analysis on the metadata 115 of the electronic dataset to determine the metadata classification 324. For example, the third multiclass classifier may include a metadata association predictor 326 and a metadata association history 325. The metadata association history 325 may include information related to previous metadata associations. For example, the metadata association history may include a data model of previous metadata associations, accuracies of the previous metadata associations, and a validity of each of the previous metadata associations and other information related to the previous metadata associations. In addition, the metadata association history 325 may include corrections, updates, and any other information regarding the validity of the previous datafield associations. The metadata association predictor 324 may refer to the metadata association history 325 to determine the metadata classification 324. For example, the metadata estimator 324 may apply statistical models and/or word models to the metadata 115 of the electronic dataset 102, the predefined identifiers 120, and/or the metadata association history 325. The metadata association predictor 326 may output a list of classifications corresponding to each of the predefined identifiers 120 being associated with the metadata 115 of the electronic dataset 102. The classifications may include accuracies for each of the predefined identifiers 120 that the metadata 115 is associated with at least one datafield that is associated with a corresponding predefined identifier.

The metadata association history 325 and/or the metadata association predictor 326 may be generated and maintained to provide the metadata classifications 324. Historical information including, for example, historical samples of the metadata 115 and their corresponding predefined identifiers 120 may be prepared. The historical information may be split into training sets and test sets. The metadata 115 may be represented by the word vectors, as described in other examples herein, and come from a diverse set of sources including, for example, logs or extracts from masterdata databases, process configurations and performance indicators, process summaries, and reports. The metadata association history 325 may be built on the training sets to generate statistical rules such that the performance of the metadata association predictor 326 in predicting the metadata classifications 324 is optimal in terms of statistics such as accuracy, confidence, probability, precision and recall. A test set is applied to the metadata association history 325 to determine if the performance of the metadata association history 325 on the test set is also satisfactory. Once a satisfactory metadata association history 325 is obtained, the metadata association history 325 may be retained. In some examples, alternative configurations of the metadata association history 325 may be updated by, for example, adjusting the parameters of the metadata association predictor 326 and/or modifying the metadata association history 325. Moreover, a rules-based word model and/or a word model based on prior knowledge may be incorporated in the metadata association history 325.

The third multiclass classifier 306 may receive the association feedback 130. The association feedback 130 may be indicative of the validity of the datafield association 130 that was made based on the metadata classification 324. For example, the association feedback 130 may include any information that is relevant to generating the metadata classification 324, such as the metadata 115 itself. In some examples, as previously discussed, the association feedback 130 may additionally include the datafield 106 and the predefined identifiers 120 that were correctly and/or incorrectly associated. The third multiclass classifier 306 may search for the previous metadata associations in the metadata association history 325 of the third multiclass classifier 306. For example, the metadata association history 325 of the third multiclass classifier 306 may be searched using the association feedback 130.

The third multiclass classifier 306 may include the feedback handler 216. The feedback handler 216 of the third multiclass classifier 306 may determine a validity indication of the metadata classification 324 based on the association feedback 130. For example the feedback handler 216 may determine that the metadata classification 324 was too confident. In other examples, the feedback handler 216 may determine that the metadata classification 324 was not confident enough. The third multiclass classifier 306 may update the statistical models based on the association feedback 130 to increase the accuracy of future predictions. For example, the metadata association history 324, or the training dataset used to build the metadata association history 324, may expand to include the association feedback 130. In some examples, when a sufficient amount of association feedback 130 has been received to warrant an update of the metadata association history 324, the metadata association history 324 is updated using an expanded dataset generated based on the metadata association history 324. Alternatively, or in addition, the metadata association predictor 326, and any statistical models comprising the metadata association predictor 326, may be updated based on the association feedback 130 and/or gained knowledge based on commercial/industrial practices.

Figure 4:
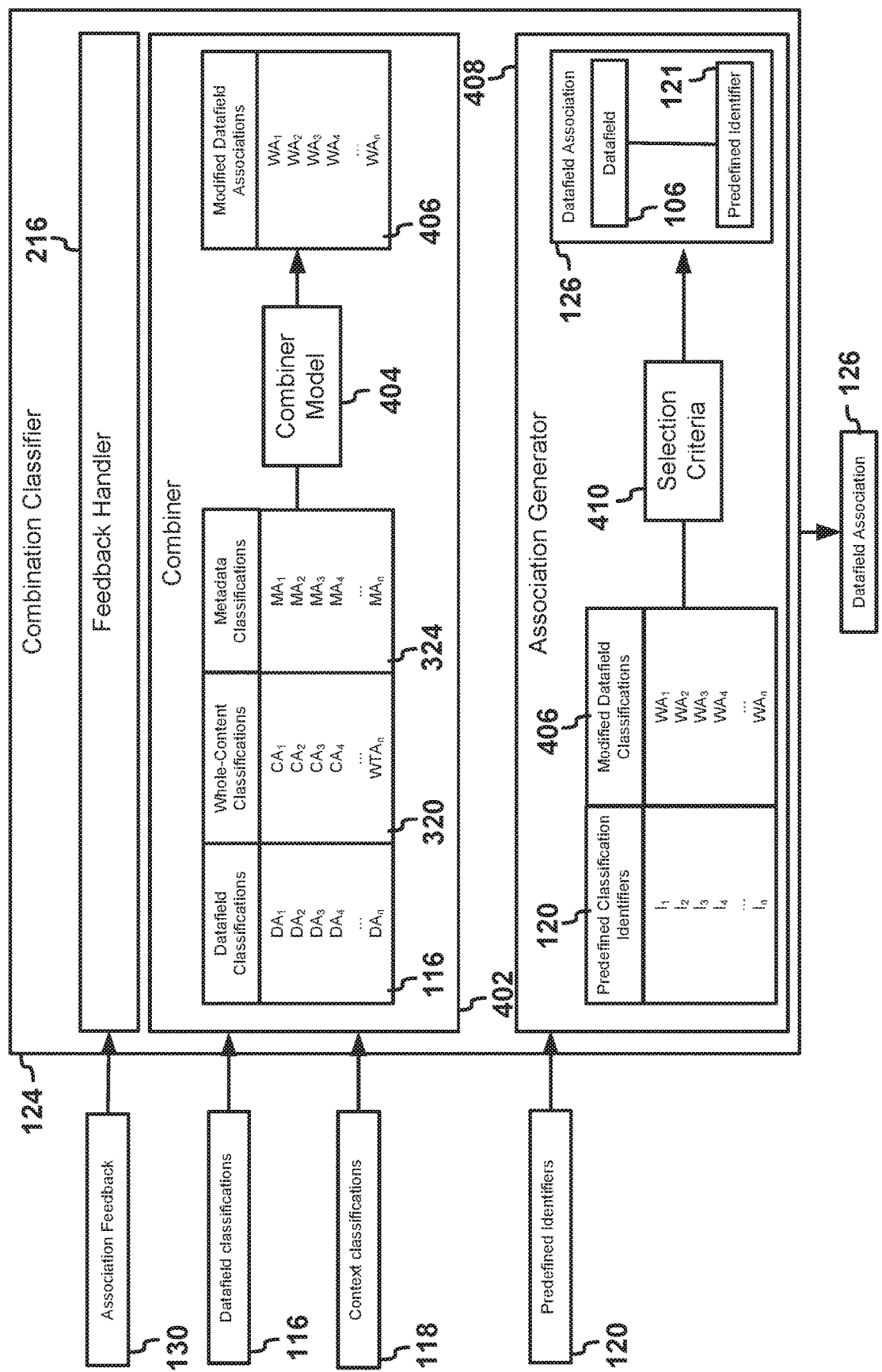
FIG. 4 illustrates an example of a combination classifier

FIG. 4 illustrates an example of the combination classifier 124. The combination classifier 124 may receive the datafield classifications 116 and the context classification 118. The combination classifier 124 may calculate the datafield association 126 based on the datafield classifications 116 and context classifications 118.

The combination classifier may include a combiner 402. The combiner 402 may include statistical models to combine the output from each of the multiclass classifiers 122 and calculate a modified datafield classifications 406. For example, the combiner 402 may include a combiner model 404. The combiner model 404 may combine the datafield classifications 116 and the context classification 118 from the multiclass classifiers 112. For example, the combiner model 116 may combine each respective accuracy in the datafield classifications 116, the whole-content classification 320, and the metadata classification 324.

The modified datafield classifications 406 may include a modified version of the datafield classifications 116 that is enhanced by the context classification 118. Thus, the modified datafield classifications 406 may include a modified datafield accuracy of one or more of the predefined identifiers 120 being representative of the datafield 106. For example, the modified datafield classifications 406 may include one or more respective accuracies corresponding to a respective predefined identifier of the group of the predefined identifiers 120. Thus, each accuracy of the modified datafield classifications 406 may correspond to the respective predefined identifier.

The combination classifier 124 may include various types of the combiner model 404. In some examples, the combiner model may include a weighting model. The weighting model may apply weight values to the output from each of the multiclass classifiers 112. For example, the combiner 402 may apply weight values to each respective accuracy in the datafield classifications 116 and the context classification 118. Accordingly, the combiner 402 may apply a first weight value to datafield classifications 116, a second weight value to the whole-content classification 320, and a third weight value to the metadata classification 324. The combiner 402 may combine the datafield 116, the whole-content 320, and the metadata 324 to form the modified datafield classifications 406. The modified datafield classifications 406 may include one or more weighted accuracies of each of the predefined identifier 120 being indicative of the datafield 106. Each of the weighted accuracies may correspond to a respective predefined identifier in the predefined identifiers 120.

For example, as illustrated in FIG. 4, the modified datafield classifications 406 may include the weighted accuracies designated $WA_1$ through $WA_n$. The datafield classifications 116 may include datafield classifications accuracies $DA_1$ through $DA_n$. The whole-content associations may include whole-content associations $CA_1$ through $CA_n$. The metadata associations may include $MA_1$ through $MA_n$. A respective modified datafield accuracy $WA_k$ may be generated by combining respective datafield accuracy $DA_k$, a respective whole-content accuracy $CA_k$, and/or a respective metadata accuracy $MA_k$. In some examples, the modified datafield accuracy $WA_k$ may be a weighted average of the respective datafield accuracy $DA_k$, the respective whole-content accuracy $CA_k$, and/or the respective metadata association $MA_k$.

The combination classifier 124 may include an association generator 408. The association generator 408 may generate the datafield association 126 based on the modified datafield classifications 406. For example, the association generator 408 may receive the combine datafield association 406. The association generator 408 may apply selection criteria 410 to the combined datafield associations 406. The association generator 408 may determine an association between the datafield 106 and the predefined identifier 121 representative of the datafield based on the selection criteria 410. Accordingly, the association generator 408 may determine the datafield association 126.

The selection criteria 410 may include criteria that are used to determine which association of the modified datafield classifications 406 should be used to make the datafield association 126. For example, the modified datafield classifications 406 may include a confidence, such as a probability. The selection criteria may provide for selecting modified datafield classifications 406 with a confidence that satisfies a predefined threshold. Alternatively or in addition, the selection criteria may provide for selecting the modified datafield classifications 406 with the highest confidence, such as the highest non-zero probability. Thus, as illustrated in the example in FIG. 4, the selection criteria 410 may provide for selecting the predefined identifier corresponding to the highest weighted accuracy of $WA_1$ through $WA_n$.

The combination classifier 124 may include the feedback handler 216. The feedback handle 216 may update the combination classifier 124 in response to the association feedback 130. The association feedback 130 may include information descriptive of a validity of the datafield association 126 that was made based on the combiner model 404 and/or the selection criteria 410. In addition, the association feedback information may include the modified datafield classifications 406 that were used by the selection criteria 410 to generate the datafield association 126. The feedback handler 216 of the combination classifier 124 may update the combiner model 404 and/or the selection criteria 410 based on the association feedback. For example, feedback handler 216 may determine that the modified datafield classifications 406 were too confident. Alternatively, the feedback handler 216 may determine that the modified datafield classifications 406 were not confident enough.

In some examples, the feedback handler 216 may update the weights used by the combiner model 404. For example, the combiner model may include the weighting model, as previously discussed. The feedback handler 216 may update the weight values applied to datafield classifications 116 and/or the context classification 118. For example, the feedback handler 216 may determine that too much weight is being applied to output from one of the multiclass classifiers 112. In response, the feedback handler 216 may update the combiner model 404 to change the amount of weight provided to the output of any of the multiclass classifiers 112.

The feedback handler 216 may also update the selection criteria 410 in response to the association feedback 130. For example, selection criteria 410 may generate the datafield association 126 for confidences greater than a confidence threshold. The feedback handler 216 may update the confidence threshold in response to the association feedback 130. For example, the association feedback 130 may indicate an incorrect datafield association with one of the predefined identifiers 120. The feedback handler 216 may increase the confidence threshold in response to the association feedback 130.

Figure 5:
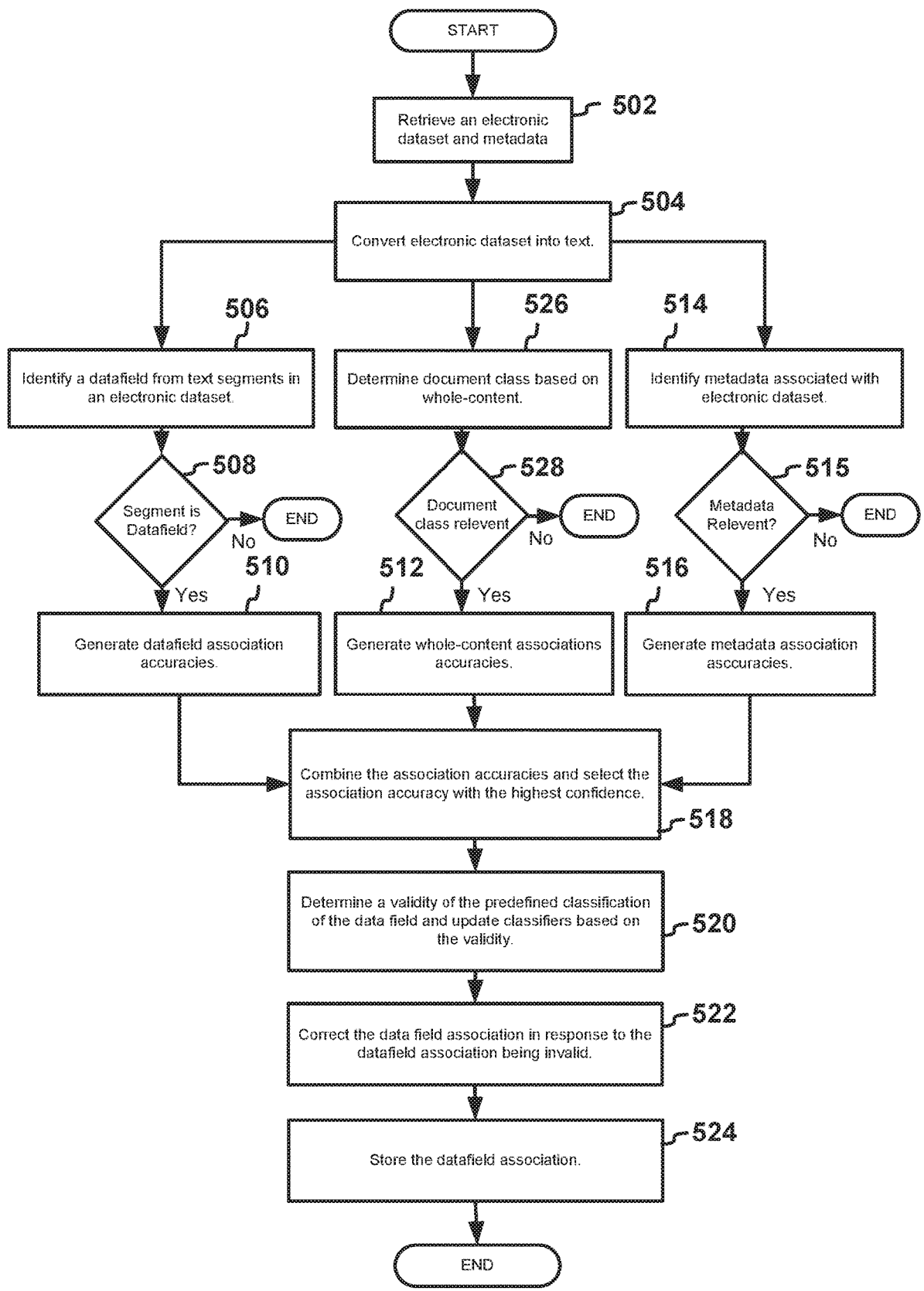
FIG. 5 illustrates a flow logic of a system to archive an electronic dataset.

FIG. 5 Illustrates flow logic of the system 100. When the system 100 starts, the system 100 may retrieve the electronic dataset 102 (502). The system 100 may retrieve the electronic dataset 102 from a memory, such as a database. The system 100 may convert the electronic dataset 102 into text (504). For example, the system 100 may apply optical character recognition to an image file to generate the text. In some examples, the system 100 may extract images from the electronic dataset 102.

The binary classifier 104 may identify the text segment 110 in the electronic dataset 102 (506). In addition, the binary classifier 104 may classify the text segment 110 as the datafield 106. For example, the binary classifier 104 may identify text of the electronic dataset 102 associated with the indicators 202 of the word model 204. In some examples the indicators 202 of the word model 204 comprise the datafield indicators 206 and the non-datafield indicators 208. The binary classifier 104 may determine that the text segment is the datafield 106 based on a confidence threshold (508). For example, the binary classifier 104 may estimate that the text segment 110 includes the datafield 106. The binary classifier 104 may determine that the text segment 110 is the datafield 106 in response to the estimate being greater than the predefined threshold.

The multiclass classifiers 114 may generate the datafield association (510). For example, the first multiclass classifier 302 may generate datafield association accuracies according to a first data model, the datafield association accuracies may respective accuracies of each predefined identifier in a group of predefined identifiers 120 being representative of the datafield 106. In some examples, the first multiclass classifiers 114 may generate the datafield classifications 116 in response to the text segment 110 comprising the datafield 106. The first multiclass classifier 302 may generate respective accuracies of each predefined identifier in the group of predefined identifiers 120 being representative of the datafield 106.

The multiclass classifiers may generate the whole-content association accuracies (512). For example the second multiclass classifier 306 may generate whole-content association accuracies according to a second data model, the whole-content association accuracies including respective accuracies of each predefined identifier in a group of predefined identifiers 120 being representative of all of the electronic dataset 102. In some examples, the second multiclass classifier 306 may receive an entirety of the electronic dataset 102. The second multiclass classifier 306 may generate respective accuracies for the whole-content of the electronic dataset that each predefined identifier in the group of predefined identifiers 120 is representative of the whole-content.

The system 100 may identify the metadata 115 associated with the electronic dataset (514). The metadata 115 may be stored in a database and/or received from a terminal. Alternatively or in addition, the system 100 may determine that a portion of the electronic dataset 102 qualifies as the metadata 115. For example, the system 100 may include data models of historical metadata determinations. The system 100 may apply a statistical model to the historical determinations and the portion of the electronic dataset 102 to determine that the portion qualifies as metadata. In some examples, the system 100 may receive images from the electronic dataset 102 and determine, using image recognitions process as described herein, that the images qualify as the metadata 115.

They system 100 may determine if the metadata 115 is relevant (515). The system 100 may determine the metadata 115 is relevant to the datafield 106 and/or electronic dataset 102. For example, the system 100 may determine that the metadata 115 validates the datafield 106 and/or electronic dataset 115. Relevance of the metadata 115 may be based on previous relevance determinations and/or other rules based on statistics and/or commercial practices. In some examples, the system 100 may determine that the metadata 115 is not relevant when the metadata 115 invalidates the datafield 106 and/or the electronic dataset 102. For example, the system 100 may determine that the metadata 115 is included in a blacklist. The blacklist may include the metadata 115 and/or an association between the metadata and other information, such as the datafield 106 or the electronic dataset 102. The system 100 may end the process if the system 100 determines that the metadata 115 invalidates the datafield 106 and/or the electronic dataset 102.

The multiclass classifiers 114 may generate the metadata association accuracies (516). For example, the third multiclass classifier 306 may generate metadata association accuracies according to a third data model, the metadata association accuracies may include respective accuracies of each predefined identifier in a group of predefined identifiers 120 being representative of the metadata 115 of the electronic dataset 102. For example, the third multiclass classifier 306 generate respective accuracies for the metadata 115 of the electronic dataset 102 that each predefined identifier in the group of predefined identifiers 120 is representative of the metadata 115.

The combination classifier 124 may combine the output of first multiclass classifier, the second multiclass classifier and the third multiclass classifier (518). For example, the combination classifier 124 may calculate modified datafield accuracies by combination of the datafield association accuracies, the whole-content association accuracies, and the metadata association accuracies, each of the modified datafield accuracies corresponding to a modified accuracy of a respective predefined identifier in the group of predefined identifiers 120 being representative of the datafield 106. In addition, the combination classifier 124 may select one of the modified datafield accuracies with the highest confidence. For example, the combination classifier 124 may receive the datafield classifications 116, whole-content classification 320, and/or the metadata classification 324. The combination classifier 124 may apply weight values to the datafield classifications 116, the whole-content classification 320, and/or the metadata classification 324 and form a weighted datafield association. The combination classifier 124 may select one of the predefined identifiers 120 as being representative of the datafield 106 based on the weighted classification set. For example, the combination classifier 124 may identify one of the weighted accuracies with a highest confidence and generate an association between the respective predefine identifier corresponding to the one of the weighted accuracies and the datafield 106.

The feedback controller 128 may determine a validity of the predefined classification of the datafield and update the classifiers based on the validity (520). For example, the feedback controller 128 may generate the association feedback 130. The association feedback 130 may be indicative of a validity of any estimation and/or accuracy made by the system. For example, the association feedback 130 may be indicative of the validity of datafield qualifications determined by the binary classifier 104. Alternatively or in addition, the association feedback 130 may be indicative of the validity of the accuracies produced by the multiclass classifiers 112 and/or the combination classifier 124. As described herein, the association feedback 130 may include any relevant information that was used to generate the datafield association, including the output from the binary classifier 104, the multiclass classifiers 112, and/or the combination classifier 124. The feedback controller 128 may communicate the association feedback 130 to each classifier. Alternatively or in addition, the feedback controller 128 may implement the feedback handler 128 of each classifier.

The feedback controller 128 may additionally correct the datafield association 126 in response to the datafield association being invalid (522). For example, feedback controller 128 may determine a correct datafield association based on the rules 122 of the identification scheme 108. The feedback controller 128 may update the datafield association 126 by associating the correct predetermined identifier with the datafield 106.

The system 100 may store the datafield association 126 (524). For example, the system 100 may store the datafield 106, the predefined identifier 121 associated with the datafield 106, or IDs that are indicative of the datafield 106 and/or the predefined identifiers.

The logic illustrated in FIG. 5 may include additional, different, or fewer operations. In some examples, the system 100 may determine a document class based on the whole-content of the electronic document 102 (526). The document class may indicate a categorization of the electronic document 102. The system 100 may determine whether the document class is relevant to the identification scheme 108 (528). In some examples, the system 100 may determine the document class based on a statistical analysis of the whole-content of the electronic dataset 102 and an association history of the document class of other electronic datasets. For example, the system 100 may apply a statistical model to the whole-content and the association history to determine the document class and whether the document class is relevant. If the document class is relevant, the system 100 may generate the whole-content association accuracies (512). The system 100 may update the association history based on the association feedback 130. If the document class is not relevant, the process may end. For example, the system 100 may end the process in response to the document class not matching a predefined set of relevant document classes. In another example, the system 100 may end the process in response to the document class indicating a duplicate electronic dataset 102.

Figure 6:
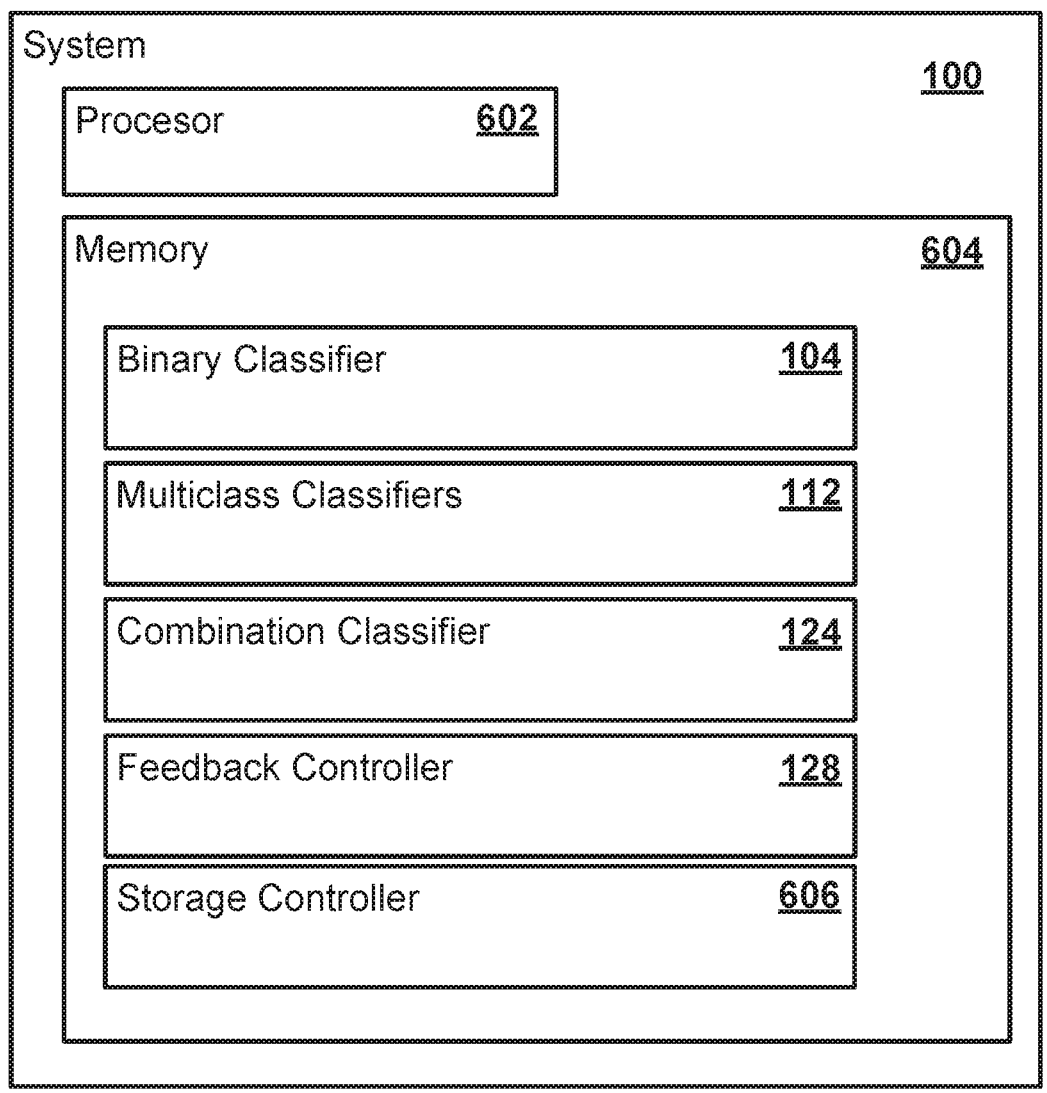
FIG. 6 illustrates an example of a system that includes a memory and a processor.

The system 100 may be implemented with additional, different, or fewer components than illustrated. For example, FIG. 6 illustrates an example of the system 100 that includes a memory 604 and a processor 602.

The processor 602 may be in communication with the memory 604. In one example, the processor 602 may also be in communication with additional elements, such as a network interface (not shown). Examples of the processor 602 may include a general processor, a central processing unit, a microcontroller, a server, an application specific integrated circuit (ASIC), a digital signal processor, a field programmable gate array (FPGA), and/or a digital circuit, analog circuit, or some combination thereof.

The processor 602 may be one or more devices operable to execute logic. The logic may include computer executable instructions or computer code stored in the memory 604 or in other memory that when executed by the processor 602, cause the processor 602 to perform the features implemented by the logic of the binary classifier 104, the multiclass classifiers 112, the combination classifiers 124, the feedback controller 128, the storage controller 606 and/or the system 100. The computer code may include instructions executable with the processor 602. The datafield storage controller may include logic to store the association between the datafield 106 and one or more of the predefined identifiers 120.

The memory 604 may be any device for storing and retrieving data or any combination thereof. The memory 604 may include non-volatile and/or volatile memory, such as a random access memory (RAM), a read-only memory (ROM), an erasable programmable read-only memory (EPROM), or flash memory. Alternatively or in addition, the memory 604 may include an optical, magnetic (hard-drive) or any other form of data storage device.

The memory 604 may include at least one of the binary classifier 104, the multiclass classifiers 112, the combination classifiers 124, the feedback controller 128, and/or the storage controller 606. In addition, the memory may include any other component previously discussed, such as the word model 204, datafield qualifier 210, the datafield association history 314, the whole-content association history 315, the metadata association history 325, combiner model 404, selection criteria 410, and/or other components of the system 100 described herein.

Each component may include additional, different, or fewer components. For example, the multiclass classifiers 112 may include the first multiclass classifier 302, the second multiclass classifier 304 and the third multiclass classifier 306. Further, the binary classifier 104 may include the feedback handler 216. In other examples, the feedback controller 128 may include the feedback handler 216.

The system 100 may be implemented in many different ways. Each circuit or circuitry may be hardware or a combination of hardware and software. The circuitry may include the binary classifier 104, the multiclass classifiers 112, the combination classifier 124, the feedback controller 128 the storage controller 606, and/or other components and subcomponents of the system 100 described herein. For example, each circuit or circuitry may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each circuitry may include memory hardware, such as a portion of the memory 604, for example, that comprises instructions executable with the processor 602 or other processor to implement one or more of the features of the circuitry. When any one of the circuitry includes the portion of the memory that comprises instructions executable with the processor 602, the circuitry may or may not include the processor 602. In some examples, each circuitry may just be the portion of the memory 604 or other physical memory that comprises instructions executable with the processor 602 or other processor to implement the features of the corresponding circuitry without the circuitry including any other hardware. Because each circuitry includes at least some hardware even when the included hardware comprises software, each circuitry may be interchangeably referred to as a hardware circuitry.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system 100 or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible.

Accordingly, the embodiments described herein are examples, not the only possible embodiments and implementations.

The subject-matter of the disclosure may also relate, among others, to the following aspects:

1. A system comprising:
   a processor;
   a binary classifier executable by the processor to identify a text segment of an electronic dataset in response to text of the electronic dataset being associated with indicators of a word model, the indicators comprising datafield indicators and non-datafield indicators, the binary classifier further executable by the processor to determine that the text is a datafield based on a comparison of the text segment with the indicators of the word model;
   a first multiclass classifier executable by the processor to receive the electronic dataset and calculate a first classification set comprising respective statistical metrics for the datafield that each predefined identifier in a group of predefined identifiers is representative of the datafield;
   a second multiclass classifier executable by the processor to receive a context of the electronic dataset and calculate a second classification set comprising respective statistical metrics for the context of the electronic dataset that each predefined identifier in the group of predefined identifiers is representative of the context;
   a combination classifier executable by the processor to apply weight values to the first classification set and the second classification set and calculate a weighted classification set, the combination classifier further executable by the processor to select a predefined identifier of the predefined identifiers as being representative of the datafield based on the weighted classification set; and
   the processor configured to store, in a memory, a data record comprising an association between the predefined identifier and the datafield.
2. The system of aspect 1, wherein the binary classifier is further executable by the processor to:
   calculate a confidence of the text segment being a datafield based on a comparison of the text segments with the datafield indicators and the non-datafield indicators; and
   determine that the text segment qualifies as the datafield in response to the confidence being greater than a predefined threshold.
3. The system of any of aspects 1 to 2, further comprising a feedback controller executable by the processor to:
   determine a validity indication of a text segment being qualified as the datafield; and
   communicate the validity indication to the binary classifier, the binary classifier responsive to the validity indication to update the word model with the text of the text segment.
4. The system of any of aspects 1 to 3, wherein the binary classifier is further executable by the processor to add text of the text segment to the datafield indicators of the word model in response to the validity indication indicative of a correct qualification of the text segment as the datafield.
5. The system of any of aspects 1 to 4, wherein the binary classifier is further executable by the processor to add text of the text segment to the non-datafield indicators of the word model in response to the validity indication indicative of an incorrect qualification of the text segment as the datafield.
6. The system of any of aspects 1 to 5, where in the context of the electronic dataset is all of the text of the electronic dataset.

7. The system of any of aspects 1 to 6, where in the context of the electronic dataset is metadata of the electronic dataset.

8. A method comprising:

identifying text of an electronic dataset associated with indicators of a word model, the indicators of the word model comprising datafield indicators and non-datafield indicators;

determining that the text comprises a datafield based a comparison of the text with the indicators of the word model;

generating datafield association statistical metrics according to a first data model, the datafield association statistical metrics including respective statistical metrics of each predefined identifier in a group of predefined identifiers being representative of the datafield;

generating whole-content association statistical metrics according to a second data model, the whole-content association statistical metrics including respective statistical metrics of each predefined identifier in a group of predefined identifiers being representative of all of the electronic dataset;

generating metadata association statistical metrics according to a third data model, the metadata association statistical metrics including respective statistical metrics of each predefined identifier in a group of predefined identifiers being representative of metadata of the electronic dataset;

calculating modified datafield statistical metrics by combination of the datafield association statistical metrics, the whole-content association statistical metrics, and the metadata association statistical metrics, each of the modified datafield statistical metrics corresponding to a modified statistical metric of a respective predefined identifier in the group of predefined identifiers being representative of the datafield;

identifying an association between the datafield and a predefined identifier from within the group of predefined identifiers based on the modified datafield statistical metrics; and storing the association between the datafield and the predefined identifier in a memory.

9. The method of aspect 8, wherein the step of identifying an association between the datafield and a predefined identifier further comprises identifying one of the modified datafield statistical metrics with a highest confidence and generating an association between the respective predefined identifier corresponding to the one of the modified datafield statistical metrics with the highest confidence and the datafield.

10. The method of any of aspect 8 to 9, wherein the step of calculating the modified datafield statistical metrics further comprises applying weight values to the datafield association statistical metrics, the whole-content association statistical metrics, and the metadata association statistical metrics; and calculating a weighted combination of the datafield association statistical metrics, the whole-content association statistical metrics, and the metadata association statistical metrics based on the weight values, wherein the modified datafield statistical metrics comprises the weighted combination.

11. The method of any of aspect 8 to 10, wherein the weight values are applied to the datafield association statistical metrics, the whole-content association statistical metrics, and the metadata association statistical metrics according to a weighting model.

12. The method of any of aspect 8 to 11, further comprising:

determining a validity indication of the association between the datafield and the predefined identifier; and improving the weighting model based on the validity indication of the association.

13. The method of any of aspect 8 to 12, wherein the step of improving the weighting model comprises adjusting the weight values applied to the datafield association statistical metrics, the whole-content association statistical metrics, and the metadata association statistical metrics.

14. The method of any of aspect 8 to 13, further comprising:

receiving a rule indicative of valid associations between the predefined identifiers and datafields;

determining a validity indication of the association between the datafield and the predefined identifier based on the rule; and updating the first data model, the second data model, and the third data model with the validity indication.

15. A computer readable storage medium comprising computer executable instructions, the computer executable instructions executable by a processor, the computer executable instructions comprising:

instructions executable to identify text of an electronic dataset associated with datafield indicators of a word model, the datafield indicators comprising groups of characters;

instructions executable to determine that the text is a datafield based on the datafield indicators;

instructions executable to generate a first classification set comprising respective statistical metrics for the datafield that each predefined identifier in a group of predefined identifiers is representative of the datafield;

instructions executable to generate a second classification set comprising respective statistical metrics for a context of the electronic dataset that each predefined identifier in the group of predefined identifiers is representative of the context.

instructions executable to apply weights to the first classification set and the second classification set and form a weighted classification set;

instructions executable to select a predefined identifier of the predefined identifiers as being representative of the datafield based on the weighted classification set; and instructions executable to store, in a memory, a data record comprising an association between the predefined identifier and the datafield.

16. The computer readable storage medium of aspect 15, further comprising:

instructions executable by the processor to identify text of an electronic dataset associated with non-datafield indicators of a word model, the non-datafield indicators comprising groups of character indicative of non-datafield text; and instructions executable by the processor to determine that the text is not a datafield based on the non-datafield indicators.

17. The computer readable storage medium of any of aspects 15 to 16, wherein the groups of characters comprise a group of characters previously determined to be a datafield.

18. The computer readable storage medium of any of aspects 15 to 17, further comprising:

instructions executable by the processor to receive a rule indicative of correct associations between the predefined identifiers and datafields;

instructions executable by the processor to determine a validity indication of the association between the predefined identifier and the datafield; and instructions executable by the processor to adjust the weights in response to the validity indication.

19. The computer readable storage medium of any of aspects 15 to 18, further comprising:

instructions executable by the processor to search an association history for a previous association of a previous datafield with a predefined identifier, the association history further including a previous validity indication of the previous association, wherein at least one of the respective statistical metrics of the first classification set are based on the previous validity indication of the previous association.

20. The computer readable storage medium of any of aspects 15 to 19, further comprising:

instructions executable by the processor to determine a validity indication of the association between the predefined identifier and the datafield; and instructions executable by the processor to update the association history with the validity indication of the association.

What is claimed is:

1. A system comprising:

a processor;

a binary classifier executable by the processor to identify a text segment of an electronic dataset in response to text of the electronic dataset being associated with indicators of a word model, the indicators comprising datafield indicators and non-datafield indicators, the binary classifier further executable by the processor to determine that the text is a datafield based on a comparison of the text segment with the indicators of the word model;

a first multiclass classifier executable by the processor to receive the electronic dataset and calculate a first classification set comprising respective statistical metrics for the datafield that each predefined identifier in a group of predefined identifiers is representative of the datafield;

a second multiclass classifier executable by the processor to receive a context of the electronic dataset and calculate a second classification set comprising respective statistical metrics for the context of the electronic dataset that each predefined identifier in the group of predefined identifiers is representative of the context;

a combination classifier executable by the processor to apply weight values to the first classification set and the second classification set and calculate a weighted classification set, the combination classifier further executable by the processor to select a predefined identifier of the predefined identifiers as being representative of the datafield based on the weighted classification set; and the processor configured to store, in a memory, a data record comprising an association between the predefined identifier and the datafield.

2. The system of claim 1, wherein the binary classifier is further executable by the processor to:

calculate a confidence of the text segment being a datafield based on a comparison of the text segments with the datafield indicators and the non-datafield indicators; and determine that the text segment qualifies as the datafield in response to the confidence being greater than a predefined threshold.

3. The system of claim 1, further comprising a feedback controller executable by the processor to:

determine a validity indication of a text segment being qualified as the datafield; and communicate the validity indication to the binary classifier, the binary classifier responsive to the validity indication to update the word model with the text of the text segment.

4. The system of claim 3, wherein the binary classifier is further executable by the processor to add text of the text segment to the datafield indicators of the word model in response to the validity indication indicative of a correct qualification of the text segment as the datafield.

5. The system of claim 3, wherein the binary classifier is further executable by the processor to add text of the text segment to the non-datafield indicators of the word model in response to the validity indication indicative of an incorrect qualification of the text segment as the datafield.

6. The system of claim 1, where in the context of the electronic dataset is all of the text of the electronic dataset.

7. The system of claim 1, where in the context of the electronic dataset is metadata of the electronic dataset.

8. A method comprising:

identifying text of an electronic dataset associated with indicators of a word model, the indicators of the word model comprising datafield indicators and non-datafield indicators;

determining that the text comprises a datafield based a comparison of the text with the indicators of the word model;

generating datafield association statistical metrics according to a first data model, the datafield association statistical metrics including respective statistical metrics of each predefined identifier in a group of predefined identifiers being representative of the datafield;

generating whole-content association statistical metrics according to a second data model, the whole-content association statistical metrics including respective statistical metrics of each predefined identifier in a group of predefined identifiers being representative of all of the electronic dataset;

generating metadata association statistical metrics according to a third data model, the metadata association statistical metrics including respective statistical metrics of each predefined identifier in a group of predefined identifiers being representative of metadata of the electronic dataset;

calculating modified datafield statistical metrics by combination of the datafield association statistical metrics, the whole-content association statistical metrics, and the metadata association statistical metrics, each of the modified datafield statistical metrics corresponding to a modified statistical metric of a respective predefined identifier in the group of predefined identifiers being representative of the datafield;

identifying an association between the datafield and a predefined identifier from within the group of predefined identifiers based on the modified datafield statistical metrics; and storing the association between the datafield and the predefined identifier in a memory.

9. The method of claim 8, wherein the step of identifying an association between the datafield and a predefined identifier further comprises identifying one of the modified datafield statistical metrics with a highest confidence and generating an association between the respective predefined identifier corresponding to the one of the modified datafield statistical metrics with the highest confidence and the datafield.

10. The method of claim 8, wherein the step of calculating the modified datafield statistical metrics further comprises applying weight values to the datafield association statistical metrics, the whole-content association statistical metrics, and the metadata association statistical metrics; and calculating a weighted combination of the datafield association statistical metrics, the whole-content association statistical metrics, and the metadata association statistical metrics based on the weight values, wherein the modified datafield statistical metrics comprises the weighted combination.

11. The method of claim 10, wherein the weight values are applied to the datafield association statistical metrics, the whole-content association statistical metrics, and the metadata association statistical metrics according to a weighting model.

12. The method of claim 11, further comprising:
determining a validity indication of the association between the datafield and the predefined identifier; and
improving the weighting model based on the validity indication of the association.

13. The method of claim 12, wherein the step of improving the weighting model comprises adjusting the weight values applied to the datafield association statistical metrics, the whole-content association statistical metrics, and the metadata association statistical metrics.

14. The method of claim 8, further comprising:
receiving a rule indicative of valid associations between the predefined identifiers and datafields;
determining a validity indication of the association between the datafield and the predefined identifier based on the rule; and
updating the first data model, the second data model, and the third data model with the validity indication.

15. A computer readable storage medium comprising computer executable instructions, the computer executable instructions executable by a processor, the computer executable instructions comprising:
instructions executable to identify text of an electronic dataset associated with datafield indicators of a word model, the datafield indicators comprising groups of characters;
instructions executable to determine that the text is a datafield based on the datafield indicators;
instructions executable to generate a first classification set comprising respective statistical metrics for the datafield that each predefined identifier in a group of predefined identifiers is representative of the datafield;
instructions executable to generate a second classification set comprising respective statistical metrics for a context of the electronic dataset that each predefined identifier in the group of predefined identifiers is representative of the context;
instructions executable to apply weights to the first classification set and the second classification set and form a weighted classification set;
instructions executable to select a predefined identifier of the predefined identifiers as being representative of the datafield based on the weighted classification set; and
instructions executable to store, in a memory, a data record comprising an association between the predefined identifier and the datafield.

16. The computer readable storage medium of claim 15, further comprising:
instructions executable by the processor to identify text of an electronic dataset associated with non-datafield indicators of a word model, the non-datafield indicators comprising groups of character indicative of non-datafield text; and
instructions executable by the processor to determine that the text is not a datafield based on the non-datafield indicators.

17. The computer readable storage medium of claim 15, wherein the groups of characters comprise a group of characters previously determined to be a datafield.

18. The computer readable storage medium of claim 15, further comprising:
instructions executable by the processor to receive a rule indicative of correct associations between the predefined identifiers and datafields;
instructions executable by the processor to determine a validity indication of the association between the predefined identifier and the datafield; and
instructions executable by the processor to adjust the weights in response to the validity indication.

19. The computer readable storage medium of claim 15, further comprising:
instructions executable by the processor to search an association history for a previous association of a previous datafield with a predefined identifier, the association history further including a previous validity indication of the previous association, wherein at least one of the respective statistical metrics of the first classification set are based on the previous validity indication of the previous association.

20. The computer readable storage medium of claim 19, further comprising:
instructions executable by the processor to determine a validity indication of the association between the predefined identifier and the datafield; and
instructions executable by the processor to update the association history with the validity indication of the association.

* * * * *